United States Patent

Mooney

Patent Number: 5,524,949
Date of Patent: Jun. 11, 1996

[54] LOAD CARRYING DEVICE

[76] Inventor: Sean S. A. Mooney, Wythemail Park Cottage, Orlingbury, Nr. Kettering, Northants NN14 1JS, United Kingdom

[21] Appl. No.: 351,259
[22] PCT Filed: Jun. 23, 1993
[86] PCT No.: PCT/GB93/01320
§ 371 Date: Jan. 17, 1995
§ 102(e) Date: Jan. 17, 1995
[87] PCT Pub. No.: WO94/00357
PCT Pub. Date: Jan. 6, 1994

[30] Foreign Application Priority Data

Jun. 23, 1992 [GB] United Kingdom ............ 9213248
Sep. 7, 1992 [GB] United Kingdom ............ 9218908
Dec. 7, 1992 [GB] United Kingdom ............ 9225561

[51] Int. Cl.⁶ .................................... B65D 33/00
[52] U.S. Cl. .................... 294/149; 294/141; 294/145; 383/8
[58] Field of Search .................... 294/27.1, 31.2, 294/32, 137, 141, 145, 149, 151–156, 159, 161, 74; 383/7, 8, 41, 100, 103; 206/545

[56] References Cited

U.S. PATENT DOCUMENTS

| 357,111 | 2/1887 | Willison | 294/137 |
| 1,456,897 | 5/1923 | McGrath | 294/161 |
| 1,493,137 | 5/1924 | Williams | 294/149 |
| 1,627,583 | 5/1927 | Thum | 294/151 |
| 3,701,559 | 10/1972 | Marino et al. | 294/74 |
| 3,865,292 | 2/1975 | Foley | 294/149 |
| 3,891,084 | 6/1975 | Elizondo-Garcia | 294/159 |

FOREIGN PATENT DOCUMENTS

| 2160414 | 12/1985 | United Kingdom | 294/149 |
| 92/09493 | 6/1992 | WIPO . | |

Primary Examiner—Dean Kramer
Attorney, Agent, or Firm—Edwin D. Schindler

[57] ABSTRACT

A carrier is disclosed for use by a person for carrying a load which is to be carried in an essentially horizontal condition. The carrier is shaped so that, in use, it provides a base for supporting the base of the load being carried, and includes a handle or loop which is located, in use, essentially centrally above the load. The carrier is in the form of a bag, which is sufficiently large at its lower end to accommodate the load to be carried in its essentially horizontal condition. The bag is provided with holes or cut-out portions dimensioned and positioned so as to receive the corners or other projecting portions of the load for stabilizing the load in its essentially horizontal condition. A method for making such a carrier, from an existing carrier bag, is also provided.

16 Claims, 3 Drawing Sheets

LOAD CARRYING DEVICE

This invention relates to load carrying devices and in particular to carrying devices for use by individuals wishing to convey articles which need to be carried in a particular orientation. More specifically, the invention relates to such carrying devices for conveying articles which are of substantially rectangular shape.

A particular example of an article which has to be carried in a particular orientation is a box containing a take-away pizza. Such a box should be carried so that the pizza is maintained in a substantially horizontal orientation. The box is typically square in plan and of a small depth sufficient to accommodate the thickness of the pizza. Currently it is a normal practice for one or more such take-away pizza packages to be carried directly by the purchaser, simply because it would not be possible to carry these articles in a conventional carrier-bag while maintaining the boxes in a horizontal condition. In order to carry one or more boxes directly, it is normally necessary for the purchaser to use both hands in order to hold the conveyed material securely in its proper orientation. Accordingly the purchaser has no hand free in order to carry other articles such as a carrier-bag full of shopping, a briefcase or an umbrella.

According to the present invention there is provided a carrier for use by a person to carry a load which is to be carried in an essentially horizontal condition, the carrier being shaped so that in use, it provides a base for supporting the base of the load and a carrying handle or loop which is located, in use, essentially centrally above the load, the carrier being in the form of a bag which is sufficiently large at its lower end to accommodate the load to be carried in its essentially horizontal condition and being provided with holes or cut-out portions dimensioned and positioned so as to receive the corners or other projecting portions of the load thereby to stabilise the load in its essentially horizontal condition.

Preferably, the carrier is adapted for use in carrying a load, such as a take-away pizza box, which is, in plan, of substantially rectangular shape.

In one embodiment, a carrier in accordance with the present invention may have a cut-out portion at each of four corners of the bag, so as to receive the four corners of a substantially rectangular load.

The bag may comprise, instead of or in addition to the holes or cut-out portions, appropriately dimensioned and positioned perforation lines which, when ruptured, provide holes which may receive corners or other projecting portions of the load. For instance, the bag may comprise four corner holes, above each of which are provided perforation lines which, when ruptured, increase the size of the original holes so as to allow the bag to accommodate loads of a greater size where necessary. Such a bag has great versatility of use, having greater strength when used to carry smaller loads but also possessing the potential to carry larger loads.

A carrier in accordance with the present invention may be made of any suitable material. By way of an example, it may be made of the sort of flexible plastics film of which conventional carrier-bags are made. By way of a further example, a carrier in accordance with the present invention may be made of a suitable textile material.

The carrier may be made from an existing carrier bag by providing in the existing bag appropriately positioned and dimensioned holes and/or cut-out portions and/or perforations lines. Thus, the present invention provides within its scope a method of making a carrier, from an existing carrier bag, in this way.

The term "load" is intended to cover not just the article which the carrier is intended to carry but also an intermediate structure located between the carrier and the article to be carried.

In one arrangement in which there is an intermediate load structure as mentioned above, the carrier may be provided with a relatively rigid box structure which is dimensioned so as to fit into the base of the carrier to provide a box into which objects may be loaded, the box having, in effect, a handle structure provided by the more flexible parts of the carrier so that the box may be carried in one hand. The holes or cut-out portions in the carrier may then receive corners of the intermediate structure. The box may be made of any suitable material, for instance cardboard, and it may be stored in a folded condition, being unfolded for use when required. It may be provided separately from, or alternatively attached to, the other parts of the carrier (i.e., the base, the carrying handle, etc. . . . ).

In another arrangement in which an intermediate load structure is provided, this structure may be in the form of a simple rectangular relatively rigid sheet made of, for instance, cardboard. Such a rigid sheet may be fitted into the base of the carrier to provide a surface onto which objects may be loaded. By way of example a carrier having this arrangement may be used to convey articles such as flowerpots containing plants which need to be carried in an essentially upright condition. Again, the sheet may be provided separately from, or attached to, the rest of the carrier.

In a yet further arrangement in accordance with the present invention, the intermediate structure may include a stack of rigid sheets, each spaced from adjacent sheets by means of one or more spacing elements, for instance, corner spacers. Such an arrangement will allow more articles to be carried within the carrier than in the case where a single rigid sheet is provided. The article may be, for instance, flowerpots containing plants, the total height of such articles being such that they can be placed on one rigid sheet, there being clearance between the top of the articles and the bottom of the adjacent, overlying rigid sheet.

It will be appreciated that carriers intended for use with an "intermediate load structure" may be transported and stored in a flat condition, either with or without the materials providing the intermediate load structure. Whether or not the intermediate load structure is supplied with the carrier to, for instance, the retailer, the arrangement may be assembled at the point of sale from the "stored flat" materials.

Embodiments of the present invention will now be described, by way of example only, with reference to the accompanying illustrative drawings, in which.

Figure 1:
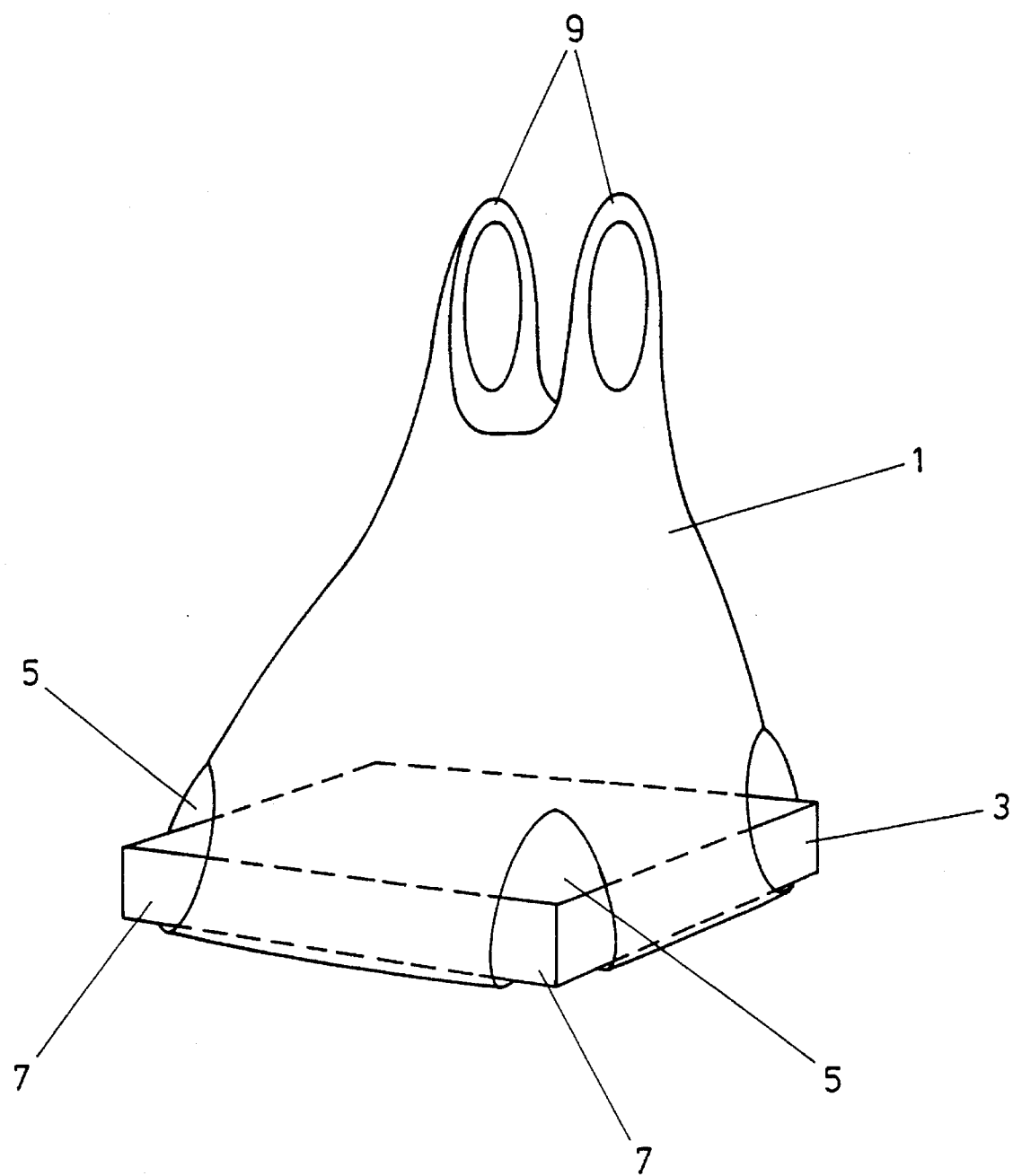
FIG. 1 shows one embodiment of a carrier according to the present invention, with a load in position within the carrier.

Referring to FIG. 1 of the accompanying drawings a carrier 1 for conveying a pizza box 3 is formed of flexible plastics film similar to that used in conventional carrier-bags. It is in the form of a bag having a lower portion of sufficient size to accommodate box 3 in an essentially horizontal condition. Box 3 is substantially square in plan and equally spaced about the lower portion of bag 1 are cut-out portions 5 through each of which projects a corner 7 of pizza box 3. These cut-out portions serve to stabilise the box 3 in its horizontal orientation.

As shown in FIG. 1, carrier 1 is provided with handles 9 which, when the carrier is in use, are located substantially centrally above pizza box 3.

Carriers such as that described above may be made by any suitable manufacturing process, for instance, by forming a cruciform base with a side wall extending integrally or non-integrally from said cruciform base up to and into an integral handle.

It will be appreciated that the carrier described above can be carried in one hand, the other hand being free for carrying other objects. It may be used to carry, for instance, take-away food boxes, flower arrangements, cakes and any other items which need to be maintained in a horizontal position. The engagement of cut-out portions 5 with projecting parts of a load being carried stabilizes the load in its desired orientation.

Figure 2:
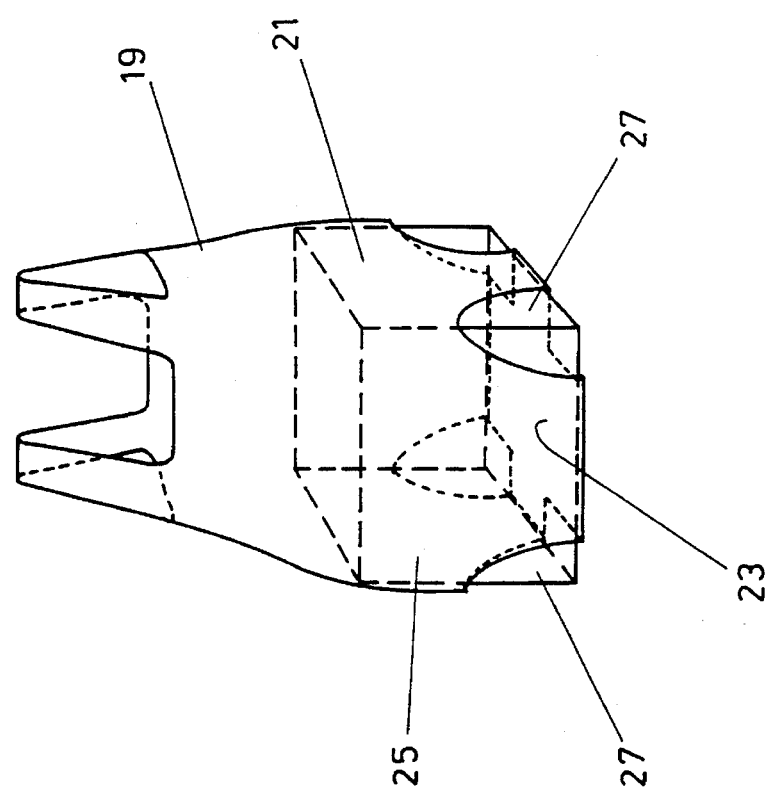
FIG. 2 shows a second embodiment of a carrier according to the present invention.

Referring now to FIG. 2 of the accompanying drawings, there is shown a carrier of broadly similar construction to that shown in FIG. 1. In this case, the carrier 19 includes a box 21 having a base 23 and four side walls 25. Box 21 has an open top and is located, as shown in FIG. 2, with its base at the bottom of the carrier 21 and its corners projecting through the cut-outs 27 in the carrier. Box 21 may be made of cardboard which may be stored in a folded condition and unfolded for use in the manner shown in FIG. 2.

Accordingly the arrangement shown in FIG. 2 provides the facility of a cardboard box which is capable of being carried with one hand.

Figure 3:
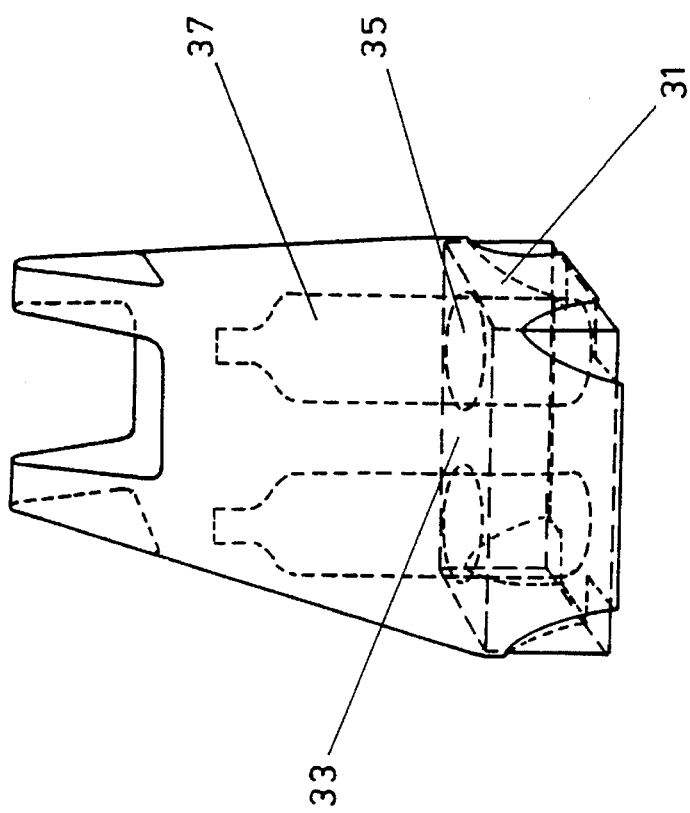
FIG. 3 shows a third embodiment of a carrier according to the present invention.

Referring now to FIG. 3, a third embodiment in accordance with the present invention is similar to that shown in FIG. 2. However in this case the cardboard box 31 is provided with a top 33 having cut-outs 35 for accommodating specific items such as liquid containing bottles 37. Such a carrier may also be used for carrying other items which are required to be held in a particular orientation, for instance, plant pots.

Figure 4:
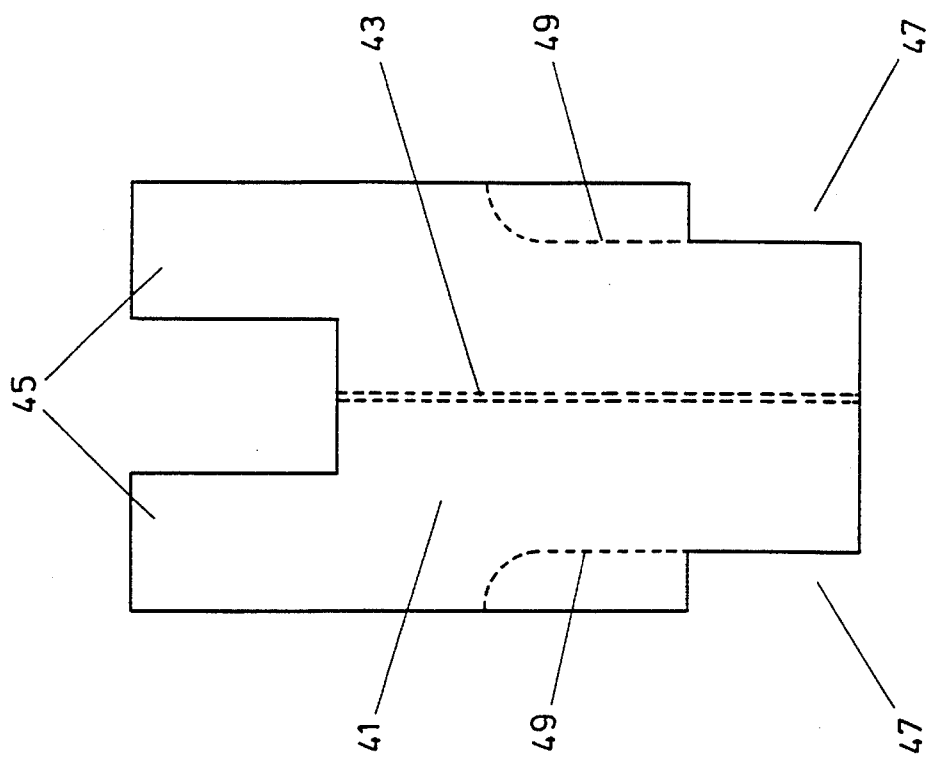

The carrier 41 shown in FIG. 4 is in the form of a gusseted carrier bag (gussets labelled 43) having handles 45 and cut-out portions 47 to each side of the gussets. Above each cut-out portion are perforations 49 which, when ruptured, increase the size of the cut-out portions and allow the accommodation of larger loads in the carrier when necessary.

Figure 5:
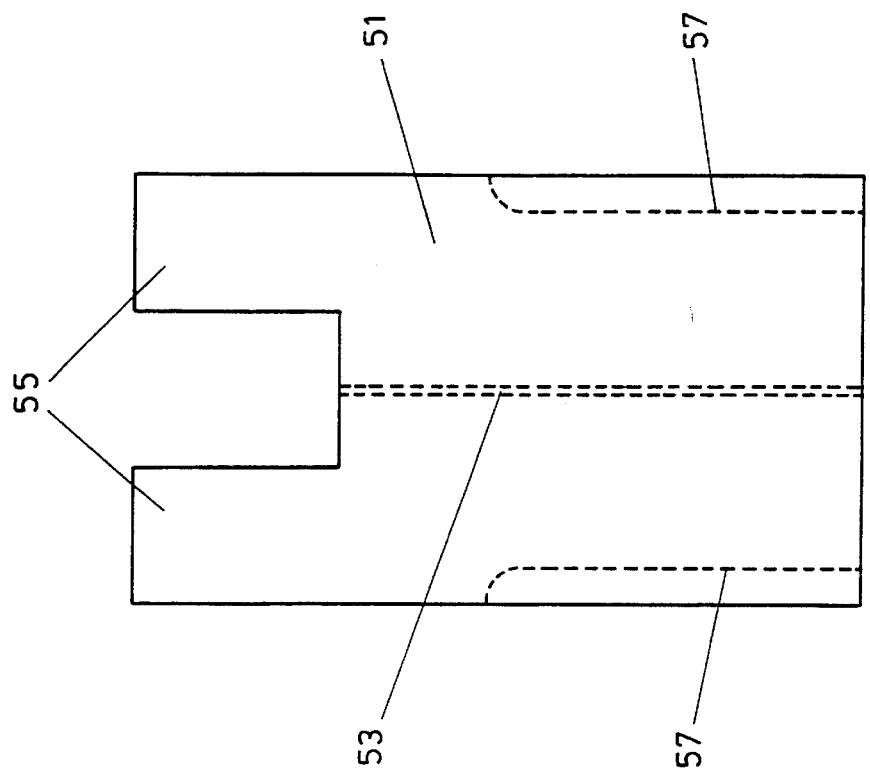
FIGS. 4 and 5 show fourth and fifth embodiments of a carrier according to the present invention.

The carrier 51 in FIG. 5 is also a gusseted (gussets 53) carrier bag having handles 55. Instead of cut-out portions, it has side perforations 57 which rupture, when necessary, to form cut-out portions. The carrier may be used as a standard carrier bag until the perforations 57 are torn so as to allow the bag to be used to carry a horizontally oriented load.

In the embodiments of FIGS. 4 and 5, the strength of the bags along the perforation liens is preferably such that a larger load will automatically cause the perforations to rupture sufficient to yield holes of an appropriate size to accommodate that load.

I claim:

1. A carrier for use by a person for carrying a load which is to be carried in an essentially horizontal condition, said carrier being shaped so that, in use, said carrier comprises:

a base for supporting a base of the load;

a carrying handle or loop which is located essentially centrally above the load, said carrier being in the form of a bag of sufficient size at its lower end for accommodating the load to be carried in its essentially horizontal condition, the bag further including a hole or cut-out portion, or perforation lines which, when ruptured, provide a hole or cut-out portion, at each of four of its corner, the holes or cut-out portions being dimensioned and positioned for receiving the four corners of a substantially rectangular load and the holes or cut-out portions originating at a position between said handle or said loop and a base of the bag, thereby allowing the base of the bag to support the base of the load for stabilizing the load in its essentially horizontal condition.

2. A carrier according to claim 1, adapted for use in carrying a load which is, in plan, of substantially rectangular shape.

3. A carrier according to claim 1, comprising both holes or cut-out portions and appropriately dimensioned and positioned perforation lines which, when ruptured, provide further holes which may receive corners or other projecting portions of a load carried in the carrier.

4. A carrier according to claim 1, additionally comprising, above each of the four holes or cut-out portions, perforation lines which, when ruptured, increase the size of the original holes or cut-out portions so as to allow the carrier to accommodate loads of a greater size.

5. A carrier according to claim 1, made from a flexible plastics material.

6. A carrier according to claim 1, made of a textile material.

7. A carrier according to claim 1, additionally comprising an intermediate load structure which is dimensioned so as to fit into the base of the carrier in use and provide a support for other articles to be carried using the carrier.

8. A carrier according to claim 7, wherein the intermediate load structure is separable from the rest of the carrier.

9. A carrier according to claim 7, wherein the intermediate load structure is attached to the rest of the carrier.

10. A carrier according to claim 7, wherein the intermediate load structure is in the form of a relatively rigid box.

11. A carrier according to claim 7, wherein the intermediate load structure is in the form of a relatively rigid rectangular sheet, which sheet provides a surface onto which articles may be loaded for carrying using the carrier.

12. A carrier according to claim 7, wherein the intermediate load structure comprises a stack of relatively rigid sheets, each sheet being spaced from adjacent sheets by means of one or more spacing elements.

13. A carrier according to claim 1, which is capable of folding into a substantially flat configuration for transportation and storage.

14. A method of producing a carrier for use by a person to carry a load which is to be carried in an essentially horizontal condition, the method comprising the steps of providing in each of four of the corners of an existing carrier bag an appropriately positioned and dimensioned hole or cut-out portion or perforation lines which, when ruptured, provide a hole or cut-out portion, the holes or cut-out portions originating at a position between a carrying handle or loop of the bag and a base of the bag and extending to the base of the bag, and being adapted, in use, to receive the four corners of a substantially rectangular load being carried using the carrier.

15. A method according to claim 14, wherein the carrier bag is provided with holes or cut-out portions and with appropriately dimensioned and positioned perforation liens which, when ruptured, provide further holes which may receive corners or other projecting portions of a load carried in the carrier.

16. A method according to claim 14, wherein the existing carrier bag is made from a flexible plastics material.

* * * * *